Figure 1:
Figure 1:
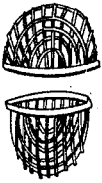
Figure 1:
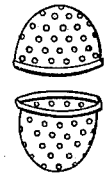

Andrews & Halsey,
Gas Generator,

Nº 6,333.          Patented Apr. 17, 1849.

Fig. 2,

Witnesses,
P. H. Brugal
Wm Denton

Inventors,
Solomon Andrews,
J. F. Halsey

UNITED STATES PATENT OFFICE.

SOLOMON ANDREWS AND JOB F. HALSEY, OF PERTH AMBOY, NEW JERSEY.

APPARATUS FOR MAKING SODA-WATER.

Specification of Letters Patent No. 6,333, dated April 17, 1849.

*To all whom it may concern:*

Be it known that we, SOLOMON ANDREWS and JOB F. HALSEY, of the city of Perth Amboy, county of Middlesex and State of New Jersey, have invented a new and Improved Soda-Fountain, and that the following is a full and exact description thereof, reference being had to the annexed drawings and making part of the specification.

Wire gage or perforated metal is formed into the shape of two cups as seen at Fig. (1) in the annexed drawing. Each cup may be made to contain such a quantity of tartaric acid, and super carbonate of soda as will neutralize each other—say, 25 grains of tartaric acid and 30 grains of super carbonate of soda, although this is not absolutely necessary. The two cups are made to fit each other at their mouths, so as to be closed together, like a box with its cover, making in this connection a ball or fountain as seen at Fig. (2). This ball or fountain when charged as above is to be dropped into a glass of water, which may contain syrup or other addenda, when the solution of the salts by the water and the union of the tartaric acid and soda takes place simultaneously evolving carbonic acid gas with the proper degree of rapidity to produce a pleasant drink. As the decomposition of the sup. carb. of soda takes place in the ball and at the bottom of the glass, the water must become entirely saturated with carbonic acid gas, as it ascends through the water. The smaller the meshes in the ball or fountain the slower will be the process, and the larger the meshes the more rapid. It will be still quicker if the two salts be mixed together before they are put into the cups; but if they are allowed to remain so mixed the sup. carb. of soda will be slowly decomposed and its carbonic acid set free. A variety of modifications of this ball or fountain may be made, in shape, in size, with a hinged cover, with handles, &c, and other substances than those named, which afford carbonic acid may be used in the same manner.

What we claim as our invention and desire to secure by Letters Patent, is—

The employment of a perforated ball or fountain in the manner set forth for the purpose of making an effervescent beverage, or a drink saturated with carbonic acid gas, called soda water.

SOLOMON ANDREWS.
J. F. HALSEY.

Witnesses:
P. H. BRUYERE,
JOEL SMITH.